(12) United States Patent
Xu et al.

(10) Patent No.: US 10,844,455 B2
(45) Date of Patent: Nov. 24, 2020

(54) METHOD FOR MANUFACTURING A HIGH STRENGTH STEEL SHEET AND SHEET OBTAINED BY THE METHOD

(71) Applicant: ArcelorMittal, Luxembourg (LU)

(72) Inventors: Wei Xu, Zelzate (BE); Artem Arlazarov, Maizeres-les-Metz (FR)

(73) Assignee: ARCELORMITTAL, Luxembourg (LU)

( * ) Notice: Subject to any disclaimer, the term of this patent is extended or adjusted under 35 U.S.C. 154(b) by 520 days.

(21) Appl. No.: 15/323,200

(22) PCT Filed: Jul. 3, 2015

(86) PCT No.: PCT/IB2015/055033
§ 371 (c)(1),
(2) Date: Dec. 30, 2016

(87) PCT Pub. No.: WO2016/001889
PCT Pub. Date: Jan. 7, 2016

(65) Prior Publication Data
US 2017/0137909 A1    May 18, 2017

(30) Foreign Application Priority Data

Jul. 3, 2014  (WO) .................. PCT/IB2014/002285

(51) Int. Cl.
| | | |
|---|---|---|
| B32B 15/01 | (2006.01) | |
| C21D 8/02 | (2006.01) | |
| C21D 9/46 | (2006.01) | |
| C22C 38/02 | (2006.01) | |
| C22C 38/04 | (2006.01) | |
| C22C 38/06 | (2006.01) | |
| C23C 2/06 | (2006.01) | |
| C23C 2/28 | (2006.01) | |
| C23C 2/40 | (2006.01) | |
| C21D 6/00 | (2006.01) | |

(52) U.S. Cl.
CPC .............. *C21D 9/46* (2013.01); *B32B 15/013* (2013.01); *C21D 6/005* (2013.01); *C21D 8/0205* (2013.01); *C21D 8/0221* (2013.01); *C21D 8/0247* (2013.01); *C21D 8/0263* (2013.01); *C22C 38/02* (2013.01); *C22C 38/04* (2013.01); *C22C 38/06* (2013.01); *C23C 2/06* (2013.01); *C23C 2/285* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | |
|---|---|---|
| 8,840,834 B2 | 9/2014 | Matsuda et al. |
| 9,103,008 B2 | 8/2015 | Beguinot et al. |
| 9,109,273 B2 | 8/2015 | Jin et al. |
| 9,121,087 B2 | 9/2015 | Matsuda et al. |
| 9,200,343 B2 | 12/2015 | Matsuda et al. |
| 9,580,779 B2 | 2/2017 | Kawasaki et al. |
| 9,617,614 B2 | 4/2017 | Hasegawa et al. |
| 2005/0224143 A1 | 10/2005 | Takabe et al. |
| 2006/0011274 A1 | 1/2006 | Speer et al. |
| 2011/0146852 A1 | 6/2011 | Matsuda et al. |
| 2011/0186189 A1 | 8/2011 | Futamura |
| 2013/0295402 A1 | 11/2013 | Oh et al. |
| 2014/0308156 A1 | 10/2014 | Oh et al. |
| 2014/0360632 A1 | 12/2014 | Hasegawa et al. |
| 2015/0203947 A1 | 7/2015 | Hasegawa et al. |

FOREIGN PATENT DOCUMENTS

| | | |
|---|---|---|
| CN | 101376945 A | 3/2009 |
| CN | 101638749 A | 2/2010 |
| CN | 101932745 A | 12/2010 |
| CN | 102149840 A | 8/2011 |

(Continued)

OTHER PUBLICATIONS

Zhao H; Shi J; Li N; Wang C; Hu J; Hui W; Cao W: "Effects of Si on the Microstructure and Mechanical Property of Medium Mn Steel Treated by Quenching and Partitioning Process", Chinese Journal of Materials Research, vol. 25, No. 1, Feb. 1, 2011, pp. 45-50.

(Continued)

*Primary Examiner* — Colin W. Slifka

(57) ABSTRACT

A method for manufacturing a high-strength steel sheet having a tensile strength of more than 1100 MPa and a yield strength of more than 700 MPa, a uniform elongation UE of at least 8.0% and a total elongation of at least 10%, made of a steel containing in percent by weight: 0.1%≤C≤0.25%, 4.5%≤Mn≤10%, 1%≤Si≤3%, 0.03%≤Al≤2.5%, the remainder being Fe and impurities resulting from the smelting, the composition being such that CMn Index=Cx(1+Mn/3.5) ≤0.6, the method comprising the steps of annealing a rolled sheet made of said steel by soaking it at an annealing temperature TA higher than the Ac transformation point of the steel but less than 1000° C., cooling the annealed sheet to a quenching temperature QT between 190° C. and 80° C. at a cooling speed sufficient to obtain a structure just after cooling containing martensite and retained austenite, maintaining the steel sheet at an overaging temperature PT between 350° C. and 500° C. for an overaging time Pt of more than 5 s cooling the sheet down to the ambient temperature. Sheet obtained.

23 Claims, No Drawings

(56) References Cited

FOREIGN PATENT DOCUMENTS

| | | |
|---|---|---|
| CN | 102912219 A | 2/2013 |
| CN | 103392022 A | 11/2013 |
| EP | 2325346 A1 | 5/2011 |
| EP | 2327810 A1 | 6/2011 |
| EP | 2546375 A1 | 1/2013 |
| EP | 2546382 A1 | 1/2013 |
| EP | 2660345 A2 | 6/2013 |
| EP | 2772556 A4 | 9/2014 |
| EP | 2881481 A1 | 6/2015 |
| JP | S62017125 A | 1/1987 |
| JP | H01259121 A | 10/1989 |
| JP | H106128631 A | 5/1994 |
| JP | 2003138345 A | 5/2003 |
| JP | 2010090475 A | 4/2010 |
| JP | 2011523442 A | 8/2011 |
| JP | 2011184756 A | 9/2011 |
| JP | 2013076162 A | 4/2013 |
| JP | 2013237923 A | 11/2013 |
| JP | 2014019941 A | 2/2014 |
| JP | 2014025091 A | 2/2014 |
| JP | 2015503023 A | 1/2015 |
| KR | 20120070739 A | 7/2012 |
| KR | 20120071583 A | 7/2012 |
| RU | 2307876 C2 | 10/2007 |
| RU | 2463373 C2 | 10/2012 |
| RU | 2474623 C1 | 2/2013 |
| RU | 2491357 C1 | 8/2013 |
| RU | 2518852 C1 | 6/2014 |
| WO | 2013061545 A1 | 5/2013 |
| WO | 2014020640 A1 | 2/2014 |

OTHER PUBLICATIONS

Emmanuel De Moor et al.: "Effect of Carbon and Maganese on the Quenching and Partitioning Response of CMnSi Steels", ISIJ International, vol. 51, No. 1, Jan. 1, 2011, pp. 137-144.

Huseyin Aydin et al.: "Effect of Intercritical Heat Treatment on the Microstructure and Mechanical Properties of Medium Steels", ISIJ International, vol. 53, No. 10, Jan. 1, 2013, pp. 1871-1880.

Seawoong Lee et al.: "On the Selection of the Optimal Intercritical Annealing Temperature for Medium TRIP Steel" Metallurgical and Materials Transactions A, vol. 44, No. 11, Jul. 17, 2013, pp. 5018-5024.

Singh, A. K. et al., "Prediction and Control of Center-Line Segregation in Continuously Cast Slabs", ISISTM Conference, 2013.

Wen Long Cui et al.: "Study of Ultra-long Life Fatigue of High Strength Steel with Duplex-Phase of Carbide-Free Bainite and Martensite", Materials Sceince Forum, vol. 539-543, Jan. 1, 2007, pp. 4532-4537.

Wang Xu et al.: "Heat Treatment Process for Transformation Induced Plasticity (TRIP) Steel", Jinshu Rechuli-Heat Treatment of Metals, Zhongguo Jixie Gongcheng Xuehui, Rechuli Xuehui, Beijing, CN, No. 6, Jan. 1, 1995, pp. 14-17, Abstract.

Zhao H; Shi J; Li N; Wang C; Hu J; Hui W; Cao W: "Effects of Si on the Microstructure and Mechanical Property of Medium Mn Steel Treated by Quenching and Partitioning Process", Chinese Journal of Materials Research, vol. 25, No. 1, Feb. 1, 2011, pp. 45-50, Abstract.

John G Speer et al: "Analysis of Microstructure Evolution in Quenching and Partitioning Automotive Sheet Steel," Metallurgical and Materials Transactions A, Sep. 15, 2011 Springer-Verlag, New York, vol. 42, Nr:12, pp. 3591-3601.

Bouaziz el al.:"Driving Force and Logic of Development of Advanced High Strength Steels for Automotive Applications," steel research international, Jun. 11, 2013.

Thomas et al."Alloy design for fundamental study of quenched and partitioned steels," Materials Science & Technology Conference & Exhibition, Columbus, OH, United States, Oct. 16-20, pp. 552-567.

De Moor et al: "Quench and Partitioning response of a Mo-alloyed CMnSi steel," New developments on metallurgy and applications of high strength steels : Buenos Aires 2008 ; international conference, May 26-28, Hilton Hotel, Buenos Aires, Argentina, May 26, 2008; May 26, 2008-May 28, 2008.

Zhao Hui et al: "Effect of Silicon on the Microstructure and Mechanical Properties of Quenched and Partitioned Medium Manganese Steel", Chinese Journal of Materials Research, vol. 25, Issue 1, pp. 45-50, Feb. 28, 2011.

Andrea Di Schino et al: "Effect of Q&P Process on 0.15C-MnSi Steels", Journal of Materials Science and Engineering 10.17265/2161-6213/2016.3-4.011.

METHOD FOR MANUFACTURING A HIGH STRENGTH STEEL SHEET AND SHEET OBTAINED BY THE METHOD

The present invention is related to a method for manufacturing a high-strength steel sheet using a continuous heat treatment line and to the sheet obtained by this method.

To produce various equipments such as trailers, trucks, agricultural machines, automotive parts and so on, high strength steel sheets made of DP (dual phase) or TRIP (transformation induced plasticity) steels are used. Some of such steels which are produced on continuous annealing lines, containing for example about 0.2% C, about 2% Mn and about 1.7% Si, have a tensile strength of about 980 MPa.

In order to reduce the weight of the equipments made of these steels, which is very desirable to improve their energy efficiency, it was proposed to use CMnSi steels containing 0.1% to 0.4% C, 2% to 4% Mn, up to 2% Si or Si+Al, such steels being heat treated in order to have a martensitic structure with a significant content of retained austenite or a ferrito-martensitic structure. Such steels are used to produce grades having a tensile strength of more than 1000 MPa. These sheets are produced on continuous annealing lines and are optionally hot dip coated. The mechanical properties of the sheets depend on the amount of residual austenite which has to be sufficiently high. This requires that the austenite is sufficiently stable. Moreover, in order to perform the treatment on existing lines with a good productivity, it is desirable that the characteristic transformation points of the steel such as $Ac_1$, $Ac_3$, Ms and Mf are not too restrictive.

For these reasons, it remains the need to have a steel and a process to manufacture easily high strength steel sheets on continuous heat treatment lines.

For this purpose the invention relates to a method for manufacturing a high-strength steel sheet having a tensile strength of more than 1100 MPa and a yield strength of more than 700 MPa and a uniform elongation UE of at least 8.0% and a total elongation of at least 10%, made of a steel containing in percent by weight:

$0.1\% \leq C \leq 0.25\%$ $4.5\% \leq Mn \leq 10\%$ $1\% \leq Si \leq 3\%$ $0.03 \leq Al \leq 2.5\%$ the remainder being Fe and impurities resulting from the smelting, the composition being such that:

$CMnIndex = C \times (1 + Mn/3.5) \leq 0.6$ the method comprising the steps of:
annealing a rolled sheet made of said steel by soaking it at an annealing temperature AT higher than the $Ac_1$ transformation point of the steel but less than 1000° C.,
cooling the annealed sheet to a quenching temperature QT between 190° and 80° C., at a cooling speed sufficient to obtain a structure just after cooling containing martensite and retained austenite,
maintaining the steel sheet at an overaging temperature PT between 350° C. and 500° C. for an overaging time Pt of more than 5 s and less than 600 s,
cooling the sheet down to the ambient temperature.

In a preferred embodiment, the annealing temperature AT is higher than the $Ac_3$ transformation point of the steel, and the quenching temperature QT is such that the structure of the steel after the final heat treatment contains at least 20% of retained austenite and at least 65% of martensite and, preferably, the sum of the ferrite and bainite contents is less than 10%.

Preferably, the chemical composition of the steel is such that:

$0.15\% \leq C \leq 0.25\%$ $4.5\% \leq Mn \leq 5.5\%$ $1.4\% \leq Si \leq 1.8\%$ $0.03 \leq Al \leq 2.5\%$ $CMnIndex = C \times (1 + Mn/3.5) \leq 0.6$ the annealing temperature AT is higher than 760° C., the quenching temperature QT is less than 170° C. and the structure of the steel contains between 20% and 30% of retained austenite.

In a particular embodiment, the quenching temperature can also be less than 150° C.

In one embodiment, the overaging temperature PT is between 380° C. and 470° C. and the sheet is maintained at the overaging temperature for a time Pt between 90 s and 600 s.

In one embodiment, the chemical composition of the steel is such that:

$0.15\% \leq C \leq 0.25\%$ $6.5\% \leq Mn \leq 7.5\%$ $1.4\% \leq Si \leq 1.8\%$ $0.03 \leq Al \leq 2.5\%$ $CMnIndex = C \times (1 + Mn/3.5) \leq 0.6$ the annealing temperature AT is higher than 710° C., the quenching temperature QT is between 120° C. and 180° C., the overaging temperature PT is between 350° C. and 450° C. and the overaging time Pt is between 50 s and 600 s.

In a particular embodiment, the chemical composition of the steel is such that:

$0.15\% \leq C \leq 0.25\%$ $4.5\% \leq Mn \leq 5.5\%$ $1.4\% \leq Si \leq 1.8\%$ $0.03 \leq Al \leq 2.5\%$ $CMnIndex = C \times (1 + Mn/3.5) \leq 0.6$ and the annealing temperature AT is less than the $Ac_3$ transformation point of the steel, the quenching temperature QT is between 110° C. and 170° C., the overaging temperature PT is between 350° C. and 450° C., the overaging time Pt is between 5 s and 600 s and preferably between 90 s and 600 s, the structure of the steel containing at least 15% of ferrite, at least 50% of martensite and at least 15% of retained austenite.

Preferably the chemical composition of the steel satisfies at least one of the following conditions:

$0.03\% \leq Al \leq 0.5\%$ $Si + Al \geq 1.4\%$ $1.4\% \leq Al \leq 2.5\%$ In one embodiment, the overaging temperature PT is between 440° C. and 470° C. and the sheet is maintained at the overaging temperature for a time Pt between 5 s and 60 s. In this case, the holding at the overaging temperature can be made by passing the sheet in a hot dip coating bath. After passing in hot a dip coating bath, the sheet can be further maintained at a temperature between 480° C. and 570° C. to be galvannealed before being cooled down to the ambient temperature.

The annealing, the quenching and the overaging can be made on a continuous heat treatment line such as a continuous annealing line which optionally comprises a hot dip coating section.

The preparation of the sheet by rolling can comprise hot rolling of a slab and optionally cold rolling.

The invention is also related to a high-strength steel sheet having a tensile strength of more than 1100 MPa and a yield strength of more than 700 MPa and a uniform elongation UE of at least 8.0% and a total elongation TE of at least 10.0%, the chemical composition of the steel containing, in weight percent:

$0.1\% \leq C \leq 0.35\%$ $4.5\% \leq Mn \leq 10\%$ $1\% \leq Si \leq 3\%$ $0.03 \leq Al \leq 2.5\%$ $CMnIndex = C \times (1+Mn/3.5) \leq 0.6$ the remainder being Fe and impurities resulting from the smelting.

In a preferable embodiment, the structure of the steel contains at least 20% of retained austenite, at least 65% of martensite and less than 10% of the sum of ferrite and bainite.

The chemical composition of the steel is preferably such that:

$0.15\% \leq C \leq 0.25\%$ $4.5\% \leq Mn \leq 5.5\%$ $1.4\% \leq Si \leq 1.8\%$ $0.03 \leq Al \leq 2.5\%$ $CMnIndex = C \times (1+Mn/3.5) \leq 0.6$ Then, the yield strength YS can be higher than 1100 MPa, the tensile strength TS higher than 1350 MPa, the uniform elongation UE can be of more than 10.0% and the total elongation TE of more than 12.0%.

In one embodiment, the chemical composition of the steel is such that:

$0.15\% \leq C \leq 0.25\%$ $6.5\% \leq Mn \leq 7.5\%$ $1.4\% \leq Si \leq 1.8\%$ $0.03 \leq Al \leq 2.5\%$ $CMnIndex = C \times (1+Mn/3.5) \leq 0.6$ and the yield strength YS is higher than 1000 MPa and the tensile strength TS is higher than 1100 MPa.

In a particular embodiment, the chemical composition of the steel is such that:

$0.15\% \leq C \leq 0.25\%$ $4.5\% \leq Mn \leq 5.5\%$ $1.4\% \leq Si \leq 1.8\%$ $0.03 \leq Al \leq 2.5\%$ $CMnIndex = C \times (1+Mn/3.5) \leq 0.6$ and the structure of the steel comprises at least 15% of ferrite, at least 50% of martensite and at least 15% of retained austenite.

Preferably the chemical composition of the steel satisfies at least one of the following conditions:

$0.03\% \leq Al \leq 0.5\%$ $Si + Al \geq 1.4\%$ $1.4\% \leq Al \leq 2.5\%$

In any case, at least one of the faces of the sheet may comprise a metallic coating or an alloyed metallic coating such as zinc coating or alloyed zinc coating.

The invention will now be described in details and illustrated by examples without introducing limitations.

The steel which is used to manufacture high-strength steel sheets according to the present invention has the following composition:

- $0.1\% \leq C \leq 0.25\%$ for ensuring a satisfactory strength and improving the stability of the austenite. Preferably, the carbon content is higher than 0.15%,
- $4.5\% \leq Mn \leq 10\%$. The manganese content must be higher than 4.5% in order to improve the stability of the retained austenite by higher chemical enrichment of austenite in manganese and decreasing the grain size of austenite. It is expected that the decreasing of the austenite grain size will reduce the diffusion distance and therefore foster the diffusion of C and Mn during the overaging step. Moreover, manganese contents higher than 4.5% decrease the Ms transformation point, the $Ac_1$ and $Ac_3$ transformation points which makes easier the achievement of heat treatment. For example, when the $Ac_3$ point is lowered, the annealing temperature can be reduced, which makes easier the heating i.e. it is possible to reduce the heating power or to increase the speed of passage of the sheet. But, the manganese content must remain less than 10% in order not to decrease too much the ductility and weldability. Preferably, the manganese content is less than 7.5%, and preferably less than 5.5%. But, in a particular embodiment it is higher than 6.5%. It must be noted that adding Al increases $Ac_3$ and counter balances the Mn effect, such addition is not detrimental up to 2.5% of Al.
- The C and Mn contents are such that the carbon-manganese index $CMnIndex = C \times (1+Mn/3.5)$ is less or equal 0.6 to ensure that the martensite should not be too brittle which is desirable to enable the mechanical cutting in good conditions. In this formula, C and Mn are the contents in weight %.
- $1\% \leq Si \leq 3\%$ and preferably $Si \geq 1.4\%$ in order to stabilize the austenite, to provide solid solution strengthening and to delay the formation of carbides during carbon redistribution from martensite to austenite resulting from the overaging. But at a too high content, silicon oxides will form at the surface which is detrimental to coatability. Thus the silicon content is preferably less than or equal to 1.8%.
- $0.03\% \leq Al \leq 2.5\%$. Al is added to deoxidize the liquid steel and it increases robustness meaning that the evolution of austenite fraction is less sensible to annealing temperature. The minimum Al content is 0.03%. At high content, aluminum delays the formation of carbides during carbon redistribution from martensite to austenite resulting from the overaging. To delay the formation of carbides the minimum content of Al+Si should be 1.4%. Preferably, the Al content is at least 1.4% to enable the weldability of the steel. The maximum of Al is 2.5%, above such an amount, delta ferrite is formed at high temperature. Delta ferrite is detrimental to weldability and is a brittle phase. It must be noted that Al increases significantly the $Ac_3$ transformation point which renders the annealing more difficult; such effect is counter balanced by the presence of high Mn contents. Particularly when there is no particular problem of weldability, the Al content can remains equal or less than 0.5%. Thus the Ac3 transformation temperature is not increased which enables to improve the productivity of the continuous annealing line.

The remainder is Fe and impurities resulting from the smelting. Such impurities include N, S, P, and residual elements such as Cr, Ni, Mo, Cu, and B.

Usually, the N content remains less than 0.01%, the S content less than 0.01%, the P content less than 0.02%, the Cr content less than 0.1%, the Ni content less than 0.1%, the Mo content less than 0.05%, the Cu content less than 0.2% and the B content less than 0.0010%. Micro alloying with Nb, Ti and V is possible in this concept but Ti content must be less than 0.1%, the Nb content less than 0.1%, and the V content less than 0.3%

With such steel, hot rolled sheets are produced. These hot rolled sheets have a thickness between 2 mm and 5 mm, for example.

Optionally, the hot rolled sheets are cold rolled in order to obtain cold rolled sheets having a thickness between 0.5 mm and 2 mm, for example. Those who are skilled in the art know how to produce such hot or cold rolled sheets.

Then the hot or cold rolled sheets are heat treated on a continuous heat treatment line such as continuous annealing line comprising at least a heating zone able to heat the sheet up to an annealing temperature, a soaking zone able to maintain the sheet at the annealing temperature or around this temperature, a cooling zone able to rapidly cool the sheet down to a quenching temperature QT, a reheating zone able to heat the sheet up to an overaging temperature PT and an overaging zone able to maintain the sheet at the overaging temperature or around this temperature for a time Pt. Optionally, the overaging zone can be a hot dip coating zone comprising at least a hot dip coating bath containing a liquid metal such as zinc and optionally an alloying zone.

Such continuous heat treatment line is known to those skilled in the art. The purpose of the heat treatment is to confer to the steel a structure suitable to obtain the desired characteristics of strength and ductility and, possibly, to hot dip the sheet.

It must be noted that contents of microstructural constituents are generally given as a surface fraction based on optical and scanning microscope pictures.

In any case, the annealing temperature AT is higher than the $Ac_1$, transformation point of the steel in order to form enough austenite able to be transformed by quenching and overaging.

If the structure of the sheet before annealing contains ferrite and pearlite and if a significant content of ferrite is desired after quenching and overaging, the annealing temperature must remain less than the $Ac_3$ transformation point of the steel.

If it is desired that the structure before quenching is completely austenitic, the annealing temperature AT must be higher than the $Ac_3$ transformation point of the steel, but it is preferable that it remains less than 1000° C. in order not to coarsen too much the austenitic grains which is unfavorable for the ductility of the obtained structure.

In any case, it is preferable to maintain the sheet at that annealing temperature at least 60 s but more than 200 s is not necessary.

It is desired that during quenching and overaging, the austenite which is formed during the annealing step is transformed at least partially in martensite. The quenching temperature QT must be less than the Ms transformation point of the steel and with a cooling speed enough to obtain a structure just after quenching containing at least martensite. The minimal cooling speed which is the critical martensitic cooling speed depends at least on the chemical composition of the steel and those which are skilled in the art know how to determine it. As it is preferably desired to have a structure containing a significant content of retained austenite, the QT temperature must not be too low and must be chosen according to the desired content of retained austenite. For that reason, the quenching temperature is between 190° which is less than the Ms transformation point, and 80° C. in order to have a sufficient amount of retained austenite. But, the quenching temperature is less than 190° because, when it is higher than this temperature, the amount of retained austenite in too important and this retained austenite can be transformed in fresh martensite after partitioning and cooling to the room temperature, which is detrimental for the ductility. More specifically, it is possible to determine for each chemical composition of the steel an optimal quenching temperature QTop that theoretically achieves an optimum residual austenite content. This optimum quenching temperature can be calculated using a relationship between the chemical composition of the steel and Ms which was newly established by the inventors:

$$Ms=561-474\times C-33\times Mn-17\times Cr-21\times Mo-11\times Si-17\times Ni+10\times Al$$

And the Koistinen Marburger relationship:

$$f\alpha'=1-\exp\{-0.011\times(Ms-T)\}$$

fα' being the proportion of martensite at the temperature T during quenching, and by assuming that, after quenching down to a temperature QT the steel is overaged at a temperature higher than QT and that due to the overaging, the partitioning of carbon between the martensite and the remaining austenite is completely realized.

Those which are skilled in the art know how to make this calculation.

The optimal quenching temperature QTop is not necessarily the quenching temperature QT which is chosen to make actual heat treatments. Preferably, the quenching temperature QT is chosen equal or near to this optimal quenching temperature and preferably less than 190° C. because, when the quenching temperature is too high, after partitioning, the austenite is at least partially transformed in fresh martensite and the obtained structure is very brittle. With the steel according to the present invention, the maximum residual austenite content which is possible to obtain after a full austenitization is between 20% and 45%. As during overaging or after it, some of the residual austenite can be transformed in bainite or in fresh martensite, the structure which is obtained after a full austenitization contains some ferrite or some bainite, the total content of such constituents is less than 10% and preferably less than 5% and the structure contains at least 65% of martensite. With the steel according to the present invention, when the quenching temperature QT is less than 80° C., the austenite content of the structure is too low, less than about 8% and even can be full martensitic. In this case, the structure which is obtained after partitioning can be very brittle.

When the austenitization is not full i.e. when the annealing temperature is between the $Ac_1$ transformation point and the $Ac_3$ transformation point of the steel, the content of austenite and martensite depends on the content of ferrite after annealing i.e. depending on the annealing temperature. But, preferably, the ferrite content is between 10% and 40%, more preferably higher than 15% and more preferably less than 35%, the martensite content is at least 50% and the retained austenite content is at least 10% and preferably at least 15%.

When the structure contains martensite and retained austenite, the purpose of the overaging is generally to transfer carbon from the martensite to the retained austenite in order to improve the ductility of the martensite and to increase the carbon content of the austenite in order to render possible a TRIP effect, without forming significant amount of bainite and/or of carbides. For this, the overaging temperature PT must be between 350° C. and 500° C. and the overaging time Pt must be at least 5 s and preferably of more than 90 s in order that the enrichment of the austenite in carbon is enough. But this time must not be too long and preferably must be not more than 600 s in order to have no or about no decomposition of the austenite in a structure like bainite. In any case, the overaging temperature PT has to be chosen sufficiently high given the overaging time Pt which depends on the characteristics of the annealing line and on the thickness of the sheet, in order to have enough transfer of carbon from martensite to austenite i.e. enough partitioning.

In a particular embodiment, the overaging temperature PT is equal to the optimal temperature for hot dip coating i.e. between 440° C. and 470° C. and typically about 460° C. Moreover, the overaging can be made at least partially by the passage of the sheet in the hot dip coating bath. In this case, the overaging temperature is between 5 s and 60 s. If the layer of coating is alloyed by heating and maintaining at a temperature between 480° C. and 570° C. for the galvannealing, this treatment will contribute to the overaging of the steel.

More precisely, with a steel having the following composition: $0.15\% \leq C \leq 0.25\%$, $4.5\% \leq Mn \leq 5.5\%$, $1.4\% \leq Si \leq 1.8\%$, $0.03 \leq Al \leq 2.5\%$, the reminder being Fe and impurities, it is possible to obtain high strength steel sheet having a yield strength YS higher than 1100 MPa, a tensile strength TS higher than 1350 MPa and a uniform elongation UE of more than 10% and a total elongation TE of more than 12% if the CMnIndex remains less than 0.6%. These properties can be obtained if the structure is essentially martensitic with a significant content of retained austenite, preferably containing more than 65% of martensite and more than 20% of retained austenite, the sum of the ferrite and bainite contents remaining less than 10%.

The sheet can be coated or not. When it is coated, it can be galvanized or galvannealed.

To obtain such steel, it is necessary to anneal the sheet at a temperature higher than the $Ac_3$ transformation point of the steel and to quench it down to a temperature less than the Ms transformation point followed by a reheating to the overaging temperature.

Regarding the $Ac_3$ transformation point, it can be noted that for this steel, it is less than about 750° C. when the Al content is less than 0.5% while it is about 850° C. for the steels generally used to produce sheets of such category. This difference of about 100° C. is very important because it is easier to heat a sheet up to a temperature that must only be higher than 750° C. than to a temperature that must be higher than 850° C. Heating needs less energy and may be faster. Thus it is possible to have a better productivity, at the same time, the $Ac_1$ and $Ac_3$ points must not be too close because if they are too close, the steel robustness will be impaired since a small annealing temperature change will induce a large modification of phase fractions and consequently unstable mechanical properties.

When the Al content is between 1.4% and 2.5%, the $Ac_3$ transformation point can be higher than 850° C., but the weldability of the steel is improved.

With this steel, it is also possible to obtain sheets having a structure containing at least 50% of martensite, at least 10% and preferably at least 15% of retained austenite and at least 10% and preferably at least 15% of ferrite. For this, the annealing temperature must be between the $Ac_1$ and $Ac_3$ transformation points and the quenching temperature must be less than the Ms transformation point. The yield strength can be higher than 1300 MPa and the total elongation can be of about 14% which is very good for the formability of the sheet. But, the yield strength is only about 750 MPa.

With a steel containing 0.15% to 0.25% C, 6.5% to 7.5% Mn, 1.4% to 1.8% Si, less $0.03 \leq Al \leq 2.5\%$ the reminder being Fe and impurities, it is possible to obtain a yield strength higher than 1000 MPa and a tensile strength higher than 1100 MPa with a structure consisting of martensite and retained austenite. Due to the high Mn content, the $Ac_1$ and Ms transformation points of this steel are significantly lowered: $Ac_1$ less than 450° C. and Ms less than 250° C. Moreover Ac3 is lowered if the Al content is less than 0.5%. In this case, Ac3 could be less than 700° C. This is useful since heat treatments are easier to realize, i.e. faster annealing and less energy consuming annealing treatments are possible.

Sheets made of steels having the compositions which are reported in table I were produced by hot rolling, the hot rolled sheets having a thickness of 2.4 mm. The hot rolled sheets were batch annealed at 600° C. for 5 hours, then pickled and cold rolled to obtain sheets having a thickness of 1.2 mm. Then, these sheets were heat treated.

Before heat treatment, an optimal quenching temperature QTop was determined for each composition. This optimal quenching temperature is the temperature at which the quenching has theoretically to be stopped in order to obtain the maximum austenite content in the structure after heat treatment. But, it is not necessarily the QT temperature that is preferable to choose for the actual heat treatment.

Each heat treatment included an annealing at an annealing temperature AT, a quenching down to a quenching temperature QT, an overaging at an overaging temperature PT during an overaging time Pt. The structures and the mechanical properties YS, TS, UE and TE were measured.

The carbon-manganese index CMnIndex, the values of the $Ae_1$, $Ae_3$ and Ms transformation points of the steels and the optimal quenching temperature QTop are reported in Table I. The $Ae_1$ and $Ae_3$ transformation points are the values at equilibrium and do not depend on the heating speed nor on the holding time at the temperature of transformation contrary to Ac1 and Ac3 which are the heating transformation points. The values of the heating transformation points are always higher than the equilibrium values and depend on the actual conditions of treatment. Those which are skilled in the art know how to determine the values of the transformations points that have to be considered in each specific case. The conditions, the structures and the mechanical properties resulting from the treatments of steels according to the invention or given as comparison are reported in table II and table III. Counter examples corresponding to steels out of the scope of the invention are reported in table IV.

TABLE I

| Cast | C % | Mn % | Si % | Al % | CMnIndex | $Ac_1$ °C. | $Ac_3$ °C. | Ms °C. | QTop °C. |
|---|---|---|---|---|---|---|---|---|---|
| H166 | 0.2 | 5 | 1.6 | 0.03 | 0.49 | 562 | 742 | 280 | 160 |
| H167 | 0.2 | 5 | 1.6 | 1.5 | 0.49 | 592 | 891 | 300 | 160 |
| H240 | 0.2 | 7.5 | 1.6 | 0.03 | 0.63 | 434 | 696 | 200 | 110 |
| H169 | 0.3 | 5 | 1.6 | 0.03 | 0.73 | 585 | 727 | 235 | 155 |
| H170 | 0.2 | 5 | — | 0.03 | 0.49 | 512 | 718 | 302 | 170 |

In this table, cast H166 and H167 are examples of the invention. The casts H240, H169 and H170 are out of the scope of the invention and are given as comparison.

TABLE II

| Test | Cast | AT °C. | QT °C. | PT °C. | Pt s | Structure | YS MPa | TS MPa | UE % | TE % |
|---|---|---|---|---|---|---|---|---|---|---|
| 1 | H166 | 820 | 20 | 400 | 500 | M( A < 2%) | 1377 | 1500 | 2.4 | 2.4 |
| 2 | H166 | 820 | 120 | 400 | 500 | M + 28% A | 1245 | 1390 | 11.9 | 15 |
| 3 | H166 | 820 | 140 | 400 | 500 | M + 30% A | 1143 | 1390 | 10.6 | 13.8 |
| 4 | H166 | 820 | 160 | 400 | 500 | M + 36% A | 1088 | 1414 | 11.7 | 14.1 |
| 5 | H166 | 820 | 180 | 400 | 500 | M + 42% A | 875- | 1475 | 9.6 | 11.6 |
| 6 | H166 | 820 | 200 | 400 | 500 | M + 31% A | 811 | 1342 | 3.9 | 3.9 |
| 7 | H166 | 820 | 230 | 400 | 500 | M + 20% A | 775 | 1616 | 3.6 | 3.6 |
| 8 | H166 | 820 | 160 | 400 | 100 | M + 29% A | 971 | 1464 | 11.2 | 13.4 |
| 9 | H166 | 820 | 160 | 450 | 500 | M + 34% A | 890 | 1457 | 11.4 | 13.8 |
| 10 | H166 | 820 | 160 | 450 | 10 | M + 27% A | 1029 | 1414 | 9.7 | 12 |
| 11 | H166 | 820 | 160 | 350 | 500 | M + 25% A | 951 | 1473 | 9.8 | 12.2 |
| 12 | H166 | 900 | 160 | 400 | 500 | M + 33% A | 1074 | 1338 | 11.3 | 14.2 |
| 13 | H166 | 800 | 160 | 400 | 500 | M + 27% A | 1125 | 1461 | 9.7 | 12.9 |
| 14 | H166 | 800 | 140 | 400 | 500 | M + 23% A | 1233 | 1452 | 11.5 | 13.9 |
| 15 | H166 | 800 | 180 | 400 | 500 | M + 29% A | 933 | 1517 | 9.7 | 11.3 |
| 16 | H166 | 800 | 160 | 400 | 100 | M + 24% A | 1093 | 1486 | 9.1 | 12.6 |
| 17 | H166 | 800 | 160 | 450 | 500 | M + 28% A | 944 | 1456 | 9.3 | 11.7 |
| 18 | H166 | 800 | 160 | 450 | 10 | M + 25% A | 1063 | 1451 | 8.9 | 12.4 |
| 19 | H166 | 700 | 120 | 400 | 500 | F + M + 45% A | 783 | 1306 | 13.9 | 14.5 |

TABLE III

| Test | Cast | AT °C. | QT °C. | PT °C. | Pt s | Structure | YS MPa | TS MPa | UE % | TE % |
|---|---|---|---|---|---|---|---|---|---|---|
| 20 | H167 | 950 | 160 | 400 | 500 | M + 18%A | 950 | 1340 | 12.6 | 15.4 |
| 21 | H167 | 950 | 140 | 400 | 500 | M + 21%A | 1021 | 1315 | 12.9 | 16.4 |
| 22 | H167 | 1050 | 160 | 400 | 500 | M + 20%A | 1000 | 1230 | 7.5 | 12.3 |
| 23 | H167 | 1050 | 140 | 400 | 500 | M + 17%A | 1020 | 1215 | 3.7 | 8.2 |
| 24 | H167 | 1050 | 180 | 400 | 500 | M + 24%A | 960 | 1210 | 9 | 13 |
| 25 | H167 | 1050 | 120 | 400 | 500 | M + 14%A | 1025 | 1260 | 3 | 7.2 |

TABLE IV

| Test | Cast | AT °C. | QT °C. | PT °C. | Pt s | Structure | YS MPa | TS MPa | UE % | TE % |
|---|---|---|---|---|---|---|---|---|---|---|
| 26 | H240 | 820 | 70 | 400 | 500 | | 1198 | 1288 | 0.9 | 0.9 |
| 27 | H240 | 820 | 90 | 400 | 500 | M + 17%A | 1090 | 1213 | 1.8 | 1.8 |
| 28 | H240 | 820 | 110 | 400 | 500 | M + 22%A | 936 | 1182 | 2.5 | 2.5 |
| 29 | H240 | 800 | 90 | 400 | 500 | | 1149 | 1274 | 1.4 | 1.4 |
| 30 | H240 | 800 | 110 | 400 | 500 | | 1021 | 1291 | 2.6 | 2.6 |
| 31 | H240 | 800 | 130 | 400 | 500 | | 1180 | 1260 | 1 | 1 |
| 32 | H240 | 800 | 180 | 400 | 1800 | M + 8%A | 780 | 1540 | 1.7 | 1.8 |
| 33 | H169 | 820 | 110 | 400 | 500 | | 1123 | 1426 | 4.5 | 4.5 |
| 34 | H169 | 820 | 130 | 400 | 500 | M + 40%A | 1000 | 1365 | 3.3 | 3.3 |
| 35 | H169 | 820 | 150 | 400 | 500 | M + 33%A | 784 | 1375 | 3.1 | 3.1 |
| 36 | H169 | 800 | 140 | 400 | 500 | M + 31%A | 950 | 1145 | 1 | 1 |
| 37 | H169 | 800 | 160 | 400 | 500 | M + 35%A | 790 | 1210 | 1.6 | 1.6 |
| 38 | H169 | 800 | 180 | 400 | 500 | | 740 | 1300 | 1.6 | 1.6 |
| 39 | H170 | 820 | 110 | 400 | 500 | | 1066 | 1263 | 5.7 | 6.1 |
| 40 | H170 | 820 | 130 | 400 | 500 | | 1020 | 1270 | 6 | 8 |
| 41 | H170 | 820 | 150 | 400 | 500 | M + 6%A | 961 | 1276 | 6.7 | 9.4 |
| 42 | H170 | 820 | 170 | 400 | 500 | M + 14%A | 947 | 1297 | 5.9 | 8.0 |

TABLE IV-continued

| Test | Cast | AT ° C. | QT ° C. | PT ° C. | Pt s | Structure | YS MPa | TS MPa | UE % | TE % |
|---|---|---|---|---|---|---|---|---|---|---|
| 43 | H170 | 800 | 150 | 400 | 500 | M + 7%A | 1000 | 1330 | 6.3 | 8.8 |
| 44 | H170 | 800 | 170 | 400 | 500 | M + 11%A | 971 | 1300 | 6.1 | 7.8 |

The examples 1 to 19 are related to a steel containing 0.2% C, 5% Mn, 1.6% Si and 0.03% Al according to the invention. Example 1 corresponds to a treatment of quenching and tempering according to the prior art, the quenching being down to the ambient temperature and the structure being about completely martensitic. For the example 19, the annealing is intercritical. All the examples 2 to 19 show that it is possible to obtain a yield strength higher than 700 MPa and a tensile strength higher than 1100 MPa. The examples 2, 3, 4, 12, 13, 14 and 16 show that with a quenching temperature equal or less than 160° C. and higher or equal to 120° C. and a partitioning (or overaging) at 400° C. for 500 s, it is possible to obtain a yield strength of more than 1050 MPa and a tensile strength of more than 1350 MPa. But, when the quenching temperature is higher than 160° C. (examples 5, 6, 7 and 15), even if the tensile strength is at least 1342 MPa, the yield strength remains less than 1000 MPa. The examples 2, 3, 4, 8, 9, 12, 14 and 19 show that it is possible to obtain an uniform elongation UE of more than 10% and a total elongation TE of more than 12%. The examples 1, 6 and 7 for which the total elongation is equal to the uniform elongation are very brittle and show that must remain less than 180° C. The example 1 show that the yield strength and the tensile strength which are obtained with a total quenching are higher than with a partial quenching, but the samples are very brittle.

The examples 20 to 25 of steel having a high content of aluminum and therefore being more easily weldable can have very good properties, for example, a yield strength of at least 950 MPa, a tensile strength of at least 1315 MPa, a uniform elongation higher than 12% and a total elongation higher than 15% (examples 20 and 21). But a comparison with the examples 23 to 25 show that it is preferable that the annealing temperature remains less than 1000° C. in order to not deteriorate the yield strength of the uniform elongation.

The counter examples 27 to 32 show that with a steel containing 7.5% of manganese and having a carbon equivalent Ceq>0.6 it is possible to obtain high yield strength and high tensile strength (YS>700 MPa and Ts>100 MPa), but all the examples are very brittle. The total elongations are always equal to the uniform elongations and are very low.

The counter examples 33 to 38 show that with the steel H167 who has a carbon equivalent Ceq of 0.73 is very brittle.

The counter examples 39 to 44 related to a steel not containing silicon show that even if the yield strength and tensile strength are similar to those of the steels according to the invention, the elongations are never as high. The maximum uniform elongation is 6.7 and the maximum total elongation is 9.4 (example 41).

The invention claimed is:

1. A steel sheet having a tensile strength of more than 1100 MPa, a yield strength of more than 700 MPa, a uniform elongation UE of at least 8.0% and a total elongation TE of at least 10.0%, comprising:
a steel having a chemical composition including, in weight percent:

$0.1\% \leq C \leq 0.25\%$;

$4.5\% \leq Mn \leq 10\%$;

$1\% \leq Si \leq 3\%$; and $0.03\% \leq Al \leq 2.5\%$;

a remainder being Fe and impurities resulting from the smelting, and
the chemical composition including a CMnIndex=C×(1+Mn/3.5)≤0.6; and
a structure consisting of at least 20% of retained austenite, at least 65% of martensite and less than 10% bainite, at least a fraction of the martensite being partitioned.

2. The steel sheet according to claim 1, wherein the chemical composition of the steel includes:

$0.15\% \leq C \leq 0.25\%$;

$4.5\% \leq Mn \leq 5.5\%$;

$1.4\% \leq Si \leq 1.8\%$;

$0.03 \leq Al \leq 2.5\%$; and

CMnIndex=C×(1+Mn/3.5)≤0.6.

3. The steel sheet according to claim 2, wherein the yield strength YS is higher than 1100 MPa, the tensile strength TS is higher than 1350 MPa, the uniform elongation UE is of more than 10% and the total elongation TE is of more than 12%.

4. The steel sheet according to claim 1, wherein the chemical composition of the steel includes:

$0.15\% \leq C \leq 0.25\%$;

$6.5\% \leq Mn \leq 7.5\%$;

$1.4\% \leq Si \leq 1.8\%$;

$0.03 \leq Al \leq 2.5\%$; and

C×(1+Mn/3.5)≤0.6, and wherein the yield strength YS is higher than 1000 MPa and the tensile strength TS is higher than 1100 MPa.

5. The steel sheet according to claim 1, wherein the chemical composition of the steel includes 0.03%≤Al≤0.5%.

6. The steel sheet according to claim 5, wherein the chemical composition of the steel includes Si+Al≥1.4%.

7. The steel sheet according to claim 1, wherein the chemical composition of the steel includes 1.4%≤Al≤2.5%.

8. The steel sheet according to claim 1, wherein at least one face of the steel sheet comprises a metallic coating.

9. The steel sheet according to claim 1, wherein all the martensite is partitioned.

10. A steel sheet having a tensile strength of more than 1100 MPa, a yield strength of more than 700 MPa, a uniform elongation UE of at least 8.0% and a total elongation TE of at least 10.0%, comprising:
a steel having a chemical composition including, in weight percent:

$0.1\% \leq C \leq 0.25\%$;

$6.5\% \leq Mn \leq 7.5\%$;

1%≤Si≤3%; and 0.03%≤Al≤2.5%;

a remainder being Fe and impurities resulting from the smelting, and the chemical composition including a CMnIndex=Cx(1+Mn/3.5)≤0.6; and a structure consisting of at least 20% of retained austenite, at least 65% of martensite and less than 10% bainite.

11. A method for manufacturing the steel sheet as recited in claim 1, comprising the steps of:

providing the steel sheet having the chemical composition as recited in claim 1, performing the following steps to obtain the structure as recited in claim 1:

annealing a rolled sheet made of the steel by soaking the rolled sheet at an annealing temperature TA higher than the Ac3 transformation point of the steel but less than 1000° C., and maintaining the rolled sheet at the annealing temperature for 60 s to 200 s, to obtain an annealed sheet;

cooling the annealed sheet to a quenching temperature QT between 190° and 80° C., at a cooling speed sufficient to obtain a quenched sheet having a structure just after cooling including martensite and retained austenite, the quenching temperature QT being such that the steel sheet produced by the method has a final structure consisting of at least 20% of retained austenite, at least 65% of martensite, and less than 10% banite, at least a fraction of the martensite being partitioned;

maintaining the quenched sheet at an overaging temperature PT between 350° C. and 500° C. for an overaging time Pt of more than 5 s;

cooling the steel sheet down to ambient temperature.

12. The method according to claim 11, wherein the chemical composition of the steel includes:

0.15%≤C≤0.25%;

4.5%≤Mn≤5.5%;

1.4%≤Si≤1.8%;

0.03%≤Al≤2.5%; and

C$x$(1+Mn/3.5)≤0.6, and wherein the annealing temperature AT is higher than 760° C., the quenching temperature QT is less than 170° C. and the final structure of the steel sheet includes between 20% and 30% of retained austenite.

13. The method according to claim 12, wherein the quenching temperature QT is less than 150° C.

14. The method according to claim 12, wherein the overaging temperature PT is between 380° C. and 470° C. and the overaging time Pt is between 90 s and 600 s.

15. The method according to claim 11, wherein the chemical composition of the steel includes:

0.15%≤C≤0.25%;

6.5%≤Mn≤7.5%;

1.4%≤Si≤1.8%;

0.03%≤Al≤2.5%; and

C$x$(1+Mn/3.5)≤0.6;

wherein the annealing temperature AT is higher than 710° C., the quenching temperature QT is between 120° C. and 180° C., the overaging temperature PT is between 350° C. and 470° C. and the overaging time Pt is between 5 s and 600 s.

16. The method according to claim 11, wherein the chemical composition of the steel includes 0.03%≤Al≤0.5%.

17. The method according to claim 16, wherein the chemical composition of the steel includes Si+Al≥1.4%.

18. The method according to claim 11, wherein the chemical composition of the steel includes 1.4%≤Al≤2.5%.

19. The method according to claim 11, wherein the overaging temperature PT is between 440° C. and 470° C. and the overaging time Pt is between 5 s and 60 s.

20. The method according to claim 19, wherein at least part of the step of maintaining the quenched sheet at the overaging temperature PT includes passing the quenched sheet in a hot dip coating bath.

21. The method according to claim 20, further comprising, after passing the sheet in the hot dip coating bath and before cooling to ambient temperature, a step of maintaining the steel sheet at a temperature between 480° C. and 570° C.

22. The method according to claim 11, wherein the annealing, the quenching and the overaging are performed on a continuous heat treatment line.

23. The method according to claim 11, wherein the rolled sheet is prepared by rolling and wherein rolling includes hot rolling and cold rolling.

* * * * *